United States Patent Office 2,920,110
Patented Jan. 5, 1960

2,920,110

PREPARATION OF META DICHLORO- AND DIBROMO-BENZENES

Alfred J. Kolka, Lathrup Village, and Harold D. Orloff, Detroit, Mich., assignors to Ethyl Corporation, New York, N.Y., a corporation of Delaware No Drawing. Original application December 11, 1952, Serial No. 325,454. Divided and this application November 30, 1956, Serial No. 627,535

7 Claims. (Cl. 260—650)

This invention relates to a novel process of halogenation and the novel products obtained therefrom. In particular, our invention relates to the addition halogenation of aromatic compounds wherein the addition of halogen is arrested before the aromatic nucleus is saturated. Our invention further relates to novel processes employing our novel products and further novel products obtained therefrom.

It has long been known that aromatic compounds will react with halogen in the presence of light by the method of addition. It further is well known that, unlike substitution halogenation, it has heretofore not been possible to arrest the addition of halogen atoms at an intermediate stage prior to saturation of the aromatic ring. The best known example of this phenomenon is the addition chlorination of benzene to produce the commercially important insecticide benzene hexachloride. In this process the only addition compounds are those in which six chlorine atoms have been added to the benzene nucleus.

Cyclohexane derivatives containing both chlorine and bromine have been known in the past and a few of such materials have been provided in pure form, although no direct general method for the manufacture of such materials has previously existed. Furthermore, it has not been possible to prepare by direct methods such materials wherein a particular spatial configuration of the chlorine and bromine is obtained.

Attempts have been made to employ readily available aliphatic materials containing both chlorine and bromine as biocidal agents. However, previous materials of this nature which have been proposed and useful are either inordinately expensive or difficult to manufacture or have other characteristics which make them unsuited for commercialization such as, for example, high volatility, poor weathering characteristics, phytotoxicity and the like.

Benzene hexachloride has been shown to contain at least five isomers. Of these only one, the gamma isomer, is insecticidally active. The other isomers show little or no activity as insecticides, and perform no useful function in insecticidal compositions. Furthermore, these inactive isomers interfere with the separation and concentration of the active gamma isomer. All practical processes for the manufacture of benzene hexachloride comprise the direct additive chlorination of benzene. However, by this direct chlorination process the active gamma isomer occurs to the extent of only 10 to 15 percent in the total benzene hexachloride fraction, and the remaining 85 to 90 percent is a mixture of at least four inactive isomers of benzene hexachloride. Several proposals have been made for increasing the amount of the gamma isomer produced by the direct chlorination of benzene, but heretofore none of these processes has achieved commercial significance. No processes have been disclosed whereby a reduction in the number of inactive isomers is achieved.

It has been proposed to concentrate by more or less conventional means the gamma isomer produced in commercial benzene hexachloride, so that an acceptably high concentration of the gamma isomer can be obtained. However, any such means of increasing the gamma concentration is inherently wasteful, since nearly 90 percent of the chlorinated product must be disposed of. In addition, processes which have been developed to a commercial stage for the concentration of gamma benzene hexachloride from an initial concentration of about 12 percent to better than 99 percent are not straightforward and require several laborious and uneconomical crystallization and solvent extraction steps. This is due in part to the initial low concentration of gamma benzene hexachloride, and in part to interference by the other isomers, some of which are present in greater quantity and which bear such a solubility relationship to the gamma isomer that they interfere with separation of the gamma isomer. Thus, to obtain pure gamma benzene hexachloride by such methods, nearly one-half of the gamma benzene hexachloride originally present in the crude benzene hexachloride is not recoverable, and about 90 percent of the chloride is wasted in the form of inactive material.

Crude benzene hexachloride, as well as some preparations rich in gamma isomer, possesses an offensive odor which makes it objectionable and unfit for certain uses. It has been stated that this odor is in large part caused by the delta isomer, which is normally present to the extent of only a few percent. Except for the drastic method of extreme purification of the gamma isomer, no method has heretofore been known for eliminating this delta isomer from otherwise usable crude benzene hexachloride, or of preventing its formation.

It is well known that the dichlorobenzenes occur in three forms, namely the ortho-, meta- and para-dichlorobenzenes. In any process for the chlorination of benzene, it is difficult, in the first place, to limit the extent of substitution chlorination such that the dichlorobenzenes are produced in substantial quantity. In commercial operations it is customary to obtain more or less dichlorobenzene as a by-product in the direct monochlorination of benzene. Furthermore, in commercial direct chlorination processes, even under the best conditions for obtaining substantial amounts of dichlorobenzenes, the ortho- and para-isomers predominate, and of these the para is the major reaction product, while the amount of meta-dichlorobenzene is insignificant, rarely exceeding one percent of the total dichloro product. A few methods have been proposed for increasing the amount of meta-dichlorobenzene produced in the direct chlorination of benzene, such as operation at elevated temperature on the order of 500° C. and higher. However, none of these methods lends itself to a practical commercial operation because of the high temperatures employed, the difficulty of control, and the expensive process equipment required.

For all practical purposes meta-dichlorobenzene can only be prepared by indirect methods. An example of such an indirect process is the mono-chlorination of nitrobenzene, followed by reduction of the so-produced meta-chloronitrobenzene to meta-chloroaniline, and preparation of meta-dichlorobenzene by the well-known Sandmeyer reaction. Such a process, however, has little commercial significance.

Both ortho-dichlorobenzene and para-dichlorobenzene have long been articles of commerce and have found many useful applications as products in themselves and as useful chemical intermediates. However, meta-dichlorobenzene is not an article of commerce because of the difficulties attending its manufacture. As a result, no significant uses have been developed for this dichlorobenzene isomer, although were it available it would have many varied and important applications as an industrial chemical intermediate.

The foregoing remarks apply to meta-dibromo aromatics as well as to the meta-dichloro compounds.

It is, therefore, an object of our invention to provide a dual process whereby the addition of chlorine or bromine to an aromatic nucleus is initiated by light, and the addition is catalytically arrested before the aromatic ring is saturated. It is a further object of our invention to provide cyclohexene derivatives wherein at least four halogen atoms are distributed around a six-membered ring which still contains a reactive double bond.

It is a further object of our invention to provide a novel means for producing benzene hexachloride. Another object of our invention is to provide benzene hexachloride containing more than the normal quantity of the insecticidally active gamma isomer. It is a further object of our invention to produce gamma benzene hexachloride without at the same time producing large quantities and a diversity of the inactive isomers, and to provide a crude benzene hexachloride substantially free of the delta isomer. Furthermore, it is an object of our invention to provide a crude benzene hexachloride from which the pure gama isomer can be separated without wasting large quantities of the gamma isomer in the purification process.

It is, likewise, an object of our invention to provide a cyclic chlorinated olefin of the cyclohexane series containing one double bond and four chlorine atoms. In particular, it is an object of our invention to provide the compound, 3,4,5,6-tetrachlorocyclohexene-1, and a process for its manufacture.

It is, furthermore, one object of our invention to provide a cyclic chlorinated olefin of the cyclohexene series containing one double bond and five chlorine atoms. In particular, it is an object of this embodiment of our invention to provide the compound, 2,3,4,5,6-pentachlorocyclohexene-1, and a direct process for its manufacture.

It is also an object of our invention to provide a cyclic chlorinated olefin of the cyclohexene series containing one double bond and six chlorine atoms. In particular, is one object of our invention to provide the compound, 1,2,3,4,5,6-hexachlorocyclohexene, and a direct process for its manufacture.

It, likewise, is an object of our invention to provide a novel cycloalipihatic compound containing both chlorine and bromine and having general utility in a number of commercial applications. It also is an object of our invention to provide a novel chlorobromohydrocarbon having a known structure and prepared by a straight-forward economical means from inexpensive raw materials.

It is, furthermore, an object of our invention to provide a direct route to aromatic dihalo compounds containing a substantial proportion of meta dihalo products. A particular object of our invention is to provide a direct process for the manufacture of meta dihalobenzenes.

It is a further object of our invention to provide a process for the manufacture of meta-dihalogenated aromatic compounds. It is a particular object of our invention to provide a means of preparing meta-dichlorobenzene.

These and other objects of our invention will appear from the further description thereof hereinafter.

We have found that when an aromatic compound is treated with chlorine or bromine in the presence of light and one of our catalysts the addition of halogen is interrupted before the normally expected complement of halogen is introduced. Thus, when prior halogenation processes would indicate that n-atoms of halogen would be introduced by addition, by employing the process of our invention (n−2) halogen atoms are introduced. This effect we refer to as the arrested addition of halogen to an aromatic nucleus.

The compounds of our invention may be considered as products of the partial addition of halogen to aromatic nuclei and we may therefore refer to our compounds more simply as aryl tetrahalides or more particularly aryl tetrachlorides and tetrabromides. In general we have provided novel 1,2,3,4-tetrahalocyclohexenes wherein the halogen is selected from the group consisting of chlorine and bromine. The general formula describing our novel materials is represented as

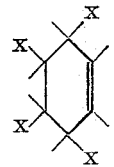

wherein X is chlorine or bromine, thus not limiting the nomenclature to the numerical designation of the halogenations. However, these compounds cannot be prepared by known methods of addition of halogen to benzene, for in all such processes six halogen atoms are added to the aromatic nucleus so that the only addition product formed is an aryl hexahalide. Our process for the manufacture of aryl tetrahalides, that is aryl tetrachlorides and aryl tetrabromides, may be considered a dual process, although it can be conducted in a single step. The first step comprises initiating the addition halogenation by light, while the second stage comprises catalytically arresting the nuclear addition at four halogen atoms.

We have found that our reaction is applicable to a diversity of aromatic compounds. Benzene derivatives such as diphenyl, diphenyl oxide, benzonitrile, benzoyl chloride, benzoic acid, nitrobenzene, benzal chloride, benzotrichloride, bromobenzene, fluorobenzene and the chlorobenzenes can be halogenated by our dual process so as to introduce four chlorine or bromine atoms by addition, retaining one double bond in the cyclohexyl nucleus. In those benzene derivatives wherein halogen atoms are already present as substitution derivatives, such halogen atoms will, of course, remain along with the four introduced by addition. In conducting our process on alkyl benzenes, such as for example, toluene, xylene, and ethyl benzene, the alkyl side chain may also be halogenated at the same time.

The process of our invention is likewise applicable to other aromatics than those derived from benzene. For example, polyaromatic hydrocarbons such as naphthalene, phenanthrene, and anthracene, as well as the alkyl derivatives and other substitution derivatives thereof, can be halogenated by our process of retarded addition halogenation. Likewise partially hydrogenated polynuclear aromatics, wherein at least one aromatic ring remains can be so reacted by our process of retarded addition halogenation. Examples of such substrates include dihydronaphthalene, tetralin, dihydrophenanthrene and the like. Furthermore, the substituted derivatives, as above, of such polynuclear aromatic hydrocarbons can be so halogenated.

As catalysts for the process of our invention we have found that elemental iodine can be used, as well as iodine chlorides and bromides and the iodides of metals, such as for example lead, potassium, sodium, mercury, magnesium and calcium as well as organic iodides such as the alkyl iodides and the tetraalkylammonium iodides. In general, we have found that the form in which the iodide is introduced is relatively unimportant. The great majority of iodine compounds liberate free iodine in the presence of chlorine and bromine, and it is in this form, or as an iodine halide, in which this preferred catalyst may be effective as a catalyst. However, we do not intend that our invention be limited to any such theory as to the mechanism of our novel reaction, for we have found that both free iodine and iodine in combination with other elements, as in the iodide salts, are effective catalysts. We have found that while the disappearance of the characteristic color of iodine may occur when small quantities of iodine are employed, we do not believe that the iodine enters into the reaction stoichiometrically, but acts as a catalyst in the sense that the amount of the product of our invention far exceeds the amount of catalyst employed. Likewise, when salts of iodine are employed as catalysts, and such salts are substantially insoluble in the reaction mixture, we may obtain a transient appearance of the characteristic iodine color, as reaction is initiated, such color disappearing in many instances as the reaction progresses. With such catalysts, the major portion of the catalyst may remain suspended as a solid throughout the duration of the chlorination, and still we will obtain complete and rapid retarded addition halogenation.

We do not intend, however, that the process of our invention be limited in its scope by the catalysts enumerated above. We have found that the arresting step of our dual process can be achieved by a variety of catalysts and a combination of conditions.

As further typical catalysts for the process of our invention we have found that oxygen-containing substances can be employed. Thus, we can introduce to the halogenation mixture oxygen, or air, either as a separate stream or in admixture with the halogen employed. Other forms in which the oxygen catalysts can be employed include ozone, and peroxides, either organic or inorganic peroxides. Among the inorganic peroxides which we employ illustrative examples include sodium peroxide, potassium tetraoxide, hydrogen peroxide, barium peroxide, calcium peroxide, lead dioxide (pyrolucite), manganese tri- and hepta-oxide, nickel sesquioxide, the di-, tri-, per- or penta-oxides of nitrogen, silver peroxide, sulfur trioxide, phosphorous pentoxide, vanadium pentoxide, ceric peroxide, selenium dioxide, bismuth pentoxide, nitrosyl chloride and the like. Thus, our catalysts can be substances containing active oxygen.

Still other examples of the active oxygen catalysts effective in our process include the organic peroxides and hydroperoxides. Typical of such materials are diacetyl peroxide, di-t-butyl peroxide, benzoyl hydrogen peroxide, benzoyl peroxide, cumene hydroperoxide, lauroyl peroxide, t-butyl perbenzoate, methyl ethyl ketone peroxide, acetyl benzoyl peroxide, t-butyl hydroperoxide, 1-hydroxycyclohexyl hydroperoxide-1, di-t-butyl-diperphthalate, monochlorodi-t-butylperoxide, oleic acid ozonide, acetone peroxide, isooctyl hydroperoxide, diisooctyl peroxide, ascaridole, peracetic acid, pinene hydroperoxide and the like.

Other examples of catalysts supplying active oxygen which are effective in the process of arrested halogenation of an aromatic nucleus include the organic hypochlorites. Among such materials we prefer to employ the alkyl hypochlorites, typical among which are the methyl, ethyl, propyl, isopropyl, butyl, sec-butyl, tert-butyl, the various amyl, hexyl, nonyl and the like hypochlorites, up to and including those containing 18 carbon atoms.

Similarly, nitrosamines are effective catalysts. These catalysts can be classified as alkyl and aryl nitrosamines, typical examples including methyl, ethyl, propyl, isopropyl, butyl, sec-butyl, tert-butyl, cyclohexyl nitrosoamine and the like, as well as aryl nitrosamines such as phenyl, naphthyl, and substituted phenyl and naphthyl nitrosamines. Furthermore, the use of light of low intensity in combination with one or more of our catalysts is effective in the novel process of our invention. While we specify that we prefer to employ light as the primary addition catalyst of our process, we have found that even in the absence of light we obtain significant quantities of the tetrahalides of our invention. However, in such embodiments of our invention, wherein the sole catalysts are chosen from among the arresting catalysts as above, the reaction rate is substantially slower, and for most practical purposes is not preferred. Thus, light becomes almost a critical feature of the process of our invention.

While we prefer to conduct the two steps of our dual process concurrently, at low temperatures or in the presence of light of low intensity we can add our arresting catalysts in such fashion that our dual process can be considered as occurring in two stages. However, whether we conduct our process in one or two stages, it is in effect a dual process, that is we initiate the addition halogenation in the presence of light and arrest the addition before saturation of the aromatic nucleus by employing a catalyst.

The products obtained by the arrested addition halogenation of the simple aromatic hydrocarbons and their halo derivatives can be referred to as the chlorides or bromides of such aromatic compounds. Thus, the product obtained by so-chlorinating benzene may be termed benzene tetrachloride. Similarly, chlorobenzene and dichlorobenzene produce, respectively, chlorobenzene tetrachloride and dichlorobenzene tetrachloride. Similarly the product of the arrested addition of bromine to benzene can be referred to as benzene tetrabromide. For more complicated structures, it is more convenient to name our compounds as derivatives of the corresponding cycloolefin. Thus, for example, the product obtained by the retarded addition chlorination of benzotrichloride can be termed trichloromethyl tetrachlorocyclohexane. The product obtained by the retarded addition chlorination of benzene has, by this terminology, the structure 3,4,5,6-tetrachlorocyclohexene-1.

Aromatic tetrahalides undergo reactions associated with the double bond in olefins and can be employed, for example, as raw materials in oxidation processes, Diels-Alder reactions, and in reactions involving addition of organic or inorganic reagents to the double bond. The important insecticide, benzene hexachloride, can be manufactured by chlorinating benzene tetrachloride additively. In addition, benzene tetrachloride finds utility in itself, as for example, as an insecticide and as an agent for causing abscission of the leaves of certain important agricultural crops.

In the process of our invention it is not essential to employ a solvent in treating those materials which are liquid at the reaction temperature. In such a reaction it is most convenient to employ sufficient excess reactant to maintain a liquid reaction medium, such excess being recovered by conventional means and recycled. For reactants which are solid at the reaction temperature we prefer to employ an inert solvent, such as for example carbon tetrachloride or other chlorinated hydrocarbons, acetic acid, carbon disulfide or other solvents common in the chlorination art.

The temperature employed in our process is not critical. In general, we prefer to employ a temperature sufficiently elevated to insure rapid reaction, but not so high as to prevent appreciable solution of the chlorine or bromine in the reaction mixture. Furthermore, we employ a temperature at which the aromatic compound is a liquid, when no solvent is employed, or at which the aromatic compound exhibits substantial solubility in the solvent, when such is employed. In general we prefer to employ a temperature between about −70° C. and 100° C.

The quantity of catalyst is not important in our process. Thus, when employing iodine in a chlorination process, as much as 20 parts of iodine per 100 parts of chlorine and as little as 0.001 part per 100 parts of chlorine can be employed. In general, we prefer to employ our catalysts between the limits of 0.1 and 5 parts per 100 parts of chlorine or bromine. When employing air or oxygen we prefer to employ quantities in excess of 0.1 part as oxygen per 1000 parts of material being chlorinated. The same general limits pertain with the other active oxygen-containing catalysts enumerated above.

The following examples of our novel process for carrying out the retarded addition halogenation of aromatic compounds will further illustrate our process. We do not, however, intend to be limited by the examples described herein as other methods for conducting our invention will be apparent to those skilled in the art.

EXAMPLE I

*Benzene tetrachloride (3,4,5,6-tetrachlorocyclohexene-1)*

To a water jacketed, vertical-tube glass reactor equipped with means for recording the temperature, a distributing tube for gaseous chlorine and means for reflux, and illuminated with an infrared lamp placed one-third of the distance from the bottom of the reactor and one inch from the outer jacket was added 2200 parts of benzene and six parts of iodine. Over a period of five hours was added 950 parts of chlorine, maintaining the addition at the rate of about three parts per minute. During this addition of chlorine the temperature of the reaction mixture was maintained between 20 and 30° C. After addition of the chlorine was complete, the infrared light was turned off and nitrogen gas was passed through the reaction mixture in the dark to remove any unreacted chlorine. The reaction mixture was then distilled to remove the excess benzene and the residue from this treatment was fractionated at a pressure of 1.5 millimeters of mercury absolute and the material distilling between 80 and 132° C. was collected as the crude product. This crude product was subsequently characterized as being a mixture of five stereoisomers of 3,4,5,6-tetrachlorocyclohexene-1. This crude product was treated with aqueous sodium sulfite to remove any iodine and dried over anhydrous sodium sulfate. After further fractionation 252 parts of benzene tetrachloride was obtained corresponding to a yield of 64.5 percent, based on the amount of chlorine reacted by addition to benzene, or 19 percent based on the total chlorine consumed. This crude product also contained 139 parts of benzene hexachloride and 958 parts of chlorobenzenes. During the reaction 322 parts of hydrogen chloride was obtained, equivalent to the chlorobenzenes produced. Crude benzene tetrachloride from several runs as above was further fractionated and 20 cuts were taken boiling between 60 and 95° C. at a pressure of 0.5 millimeter of mercury. This product consisted of a mixture of the five stereoisomers of 3,4,5,6-tetrachlorocyclohexene-1. The distillation data were as follows:

*Recovery of crude benzene tetrachloride*

| Cut No. | Boiling Point, °C., at 0.5 mm. of Hg | Amount, Parts by Weight |
|---|---|---|
| 1-6 | 62-67 | 1,265.4 |
| 7-14 | 67-85 | 778.6 |
| 15-20 | 85-95 | 476.0 |
| Total | | 2,520.0 |

EXAMPLE II

Cuts 1 through 6 from the distillation of Example I were combined and maintained at a temperature of 0° C. for seven days. During this period a crystalline material formed. This solid, 815.4 parts, was removed by filtration and recrystallized from isopentane. The purified material melted at 33.2 to 33.5° C., and contained 64.53 percent chlorine which is that required for the formula $C_6H_6Cl_4$. This isomer of 3,4,5,6-tetrachlorocyclohexene-1 was designed alpha.

EXAMPLE III

The filtrate from the separation of Example II was combined with cuts 7 to 20 of Example I. A total of 1705 parts of this material was fractionated in a 2.8 x 122 cm. column packed with 3/32 inch multiple turn glass helices. The distillation was conducted at a stillhead pressure of 8.0 mm. of mercury at a 20 : 1 reflux ratio and a takeoff rate of 10 ml./hr. Thirty fractions were recovered up to a still temperature of 163° C. This material had a distillation temperature range of 110 to 147° C. at 8 mm. The ten high boiling cuts were kept at a temperature of 0° C. for a period of seven days, at the end of which time 15 percent had crystallized. This crystalline material was removed by filtration and the filtrate was submitted to chromatographic adsorption. For this purpose a 5.1 x 195 cm. glass column was packed with 1500 g. of silicic acid. Through this column was passed 53.86 parts obtained by the above distillation of a fraction boiling at 128° C. at 8.0 mm. This material was diluted before treatment with an equal volume of normal hexane. This hexane reagent was pretreated by percolating at 25° C. through a 4 x 50 cm. column packed with 300 grams of activated silica gel of 28 to 200 mesh. The column was then eluted with hexane saturated with nitromethane, collecting a total of 280 50 ml. samples which were evaporated to dryness. Cuts of similar melting points and infrared spectra were combined and recrystallized at 0.° C. from normal hexane. By a series of operations comprising recombining similar end cuts and recrystallization, the five isomers of 3,4,5,6-tetrachlorocyclohexene-1 were obtained.

EXAMPLE IV

*Benzene tetrachloride (3,4,5,6-tetrachlorocyclohexene-1)*

To a water jacketed, vertical-tube glass reactor equipped with means for recording the temperature, a distributing tube for gaseous chlorine and means for reflux, and illuminated with an infrared lamp placed one-third of the distance from the bottom of the reactor and six inches from the outer jacket was added 2200 parts of benzene. Over a period of five hours was added 950 parts of chlorine containing 1 part of oxygen, maintaining the addition at the rate of about 3 parts per minute. During this addition of chlorine the temperature of the reaction mixture was maintained between 20 and 30° C. After addition of the chlorine was complete the infrared light was turned off and nitrogen gas was passed through the reaction mixture in the dark to remove any unreacted chlorine. The reaction mixture was then distilled to remove the excess benzene and the residue from this treatment was rectified at a pressure of 1.5 millimeters of mercury absolute and the material distilling between 80 and 132° C. was collected as the crude product. This crude product was treated with aqueous sodium sulfite to remove a trace of iodine and dried over anhydrous sodium sulfate. After further fractionation 79 parts of benzene tetrachloride containing all the isomers thereof was obtained. The crude benzene tetrachloride was further fractionated and the material boiling between 60 and 70° C. at a pressure of 0.5 millimeter of mercury was separated. This material, on standing, solidified and was further purified by crystallization from isopentane, to give a product melting at 34.4 to 35.6° C. Analysis showed this material to contain 32.97 percent carbon, 2.87 percent hydrogen and 64.53 percent chlorine. The theoretical analysis, calculated for $C_6H_6Cl_4$, is 32.75 percent carbon, 2.71 percent hydrogen and 64.53 percent chlorine.

Consideration of the spatial configuration of the cyclohexene molecule leads to the possibility of ten theoretical isomers of benzene tetrachloride. On the basis of ring conversion and strain in the molecule, these ten theoretical isomers are reduced to five separable forms. Thus, the five stereochemical isomers of 3,4,5,6-tetrachlorocyclohexene-1 which we have isolated and characterized constitute the physically plausible forms of the compound. We have designated these as the alpha, beta, gamma, delta, and epsilon isomers, named in the order of their isolation. The melting point and boiling point of these isomers is as follows:

|        | M.P., °C. | B.P., °C./mm. Hg |
|--------|-----------|------------------|
| α-BTC[1] | 33.2–33.5 | 72–74°/1 |
| β-BTC  | 79.2–79.7 | 88–90°/1 |
| γ-BTC  | 88.2–88.8 | 88–20°/1 |
| δ-BTC  | 51.7–52.0 | 88–90°/1 |
| ε-BTC  | 98.7–99.3 |                  |

[1] BTC = Benzene tetrachloride.

The amount of chlorine employed in relation to the amount of benzene treated can be varied within broad limits, and we have found that one method of increasing the quantity of benzene tetrachloride formed in a process such as that described in the above examples, can be achieved by increasing the amount of chlorine in a continuous operation such that the chlorine is not completely converted to organic chlorinated materials. The temperature range employed in the manufacture of benzene tetrachloride is not critical, but in general we prefer to employ temperatures in the range of −70° C. to 100° C.

We have established a reactive double bond of our benzene tetrachloride by a number of methods. For example, we have oxidized benzene tetrachloride by potassium permanganate, obtaining a chlorinated dicarboxylic acid wherein the acid contained four chlorine atoms. By this means we have also established that the chlorine atoms are not attached to either of the carbon atoms of the double bond.

The reactive carbon-to-carbon double bond in the novel compound of our invention undergoes all the normal reactions characteristic of an olefin. For example, we can form a dibromo derivative by treating benzene tetrachloride with bromine in an inert solvent. Furthermore, other oxidizing agents may be employed and, depending on the character of the oxidizing agent, we can obtain either a diol, a dialdehyde or, as above, a dicarboxylic acid. Likewise, other reagents will react with benzene tetrachloride to produce derivatives whereby atoms or groups are added to this double bond, either symmetrically or unsymmetrically, such as for example, butadiene, cyclopentadiene, thiocyanogen, ozone, peracetic acid, cyanogen bromide, hydrogen cyanide, hydrogen bromide, mercaptans, nitric acid, nitrogen oxides, diazo compounds, azides, sulfites, aryl sulfinic acids, hypohalous acids, etc.

To establish further the structure of our benzene tetrachloride as 3,4,5,6-tetrachlorocyclohexene-1, a series of chlorination reactions was conducted, both on mixtures of the five stereoisomers and upon the individual stereoisomers, by treating carbon tetrachloride solutions of the benzene tetrachloride with chlorine at a temperature of about 30° C. while illuminating the reaction mixture with a Hanovia ultraviolet lamp. By this procedure, all the known benzene hexachlorides were obtained, although the delta isomer of benzene hexachloride was produced in extremely small quantities. Thus, alpha benzene tetrachloride produces a mixture substantially comprising alpha and gamma benzene hexachloride; beta benzene tetrachloride produces almost exclusively the alpha and epsilon isomers of benzene hexachloride; gamma benzene tetrachloride produces predominantly alpha and gamma benzene hexachlorides; delta benzene tetrachloride produces primarily alpha benzene hexachloride with minor quantities of the beta and delta isomers; while epsilon benzene tetrachloride produces a mixture of which the major component is the epsilon isomer of benzene hexachloride.

EXAMPLE V

Chlorination of benzene tetrachloride

In a glass reaction vessel provided with means for cooling or supplying heat was placed 100 parts of alpha benzene tetrachloride (α-BTC) and 408 parts of carton tetrachloride containing 32.3 parts of chlorine dissolved therein. The resulting solution was maintained at a temperature of about 30° C. and illuminated by a daylight fluorescent bulb for a period of one-half hour. During this period crystals deposited on the walls of the reactor, and the supernatant liquid was decanted. The solid material was collected separately and dried. This product weighed 72 parts and was shown by infrared analysis to comprise 93 percent alpha benzene hexachloride (α-BHC) and 4 percent gamma benzene hexachloride (γ-BHC). The carbon tetrachloride solution was evaporated to dryness giving 51 parts of additional BHC. Only the alpha and gamma isomers of benzene hexachloride were found to be present, in the ratio of 25 percent gamma, and 75 percent alpha. The beta, delta and epsilon isomers of benzene hexachloride were not present in the reaction product. The total yield of gamma benzene hexachloride was 13 percent based on the benzene tetrachloride reacted.

EXAMPLE VI

Chlorination of benzene tetrachloride

Alpha benzene tetrachloride was treated with chlorine in another operation similar to Example I with the exception that 640 parts of glacial acetic acid was used as a solvent. The total amount of benzene hexachloride obtained from 100 parts of α-BTC was 100 parts, or a yield of 76 percent. This BHC contained 13.6 percent gamma and 86.4 percent alpha isomers. No other isomers were detected by infrared analysis.

EXAMPLE VII

Chlorination of benzene tetrachloride

In a chlorination of α-BTC in carbon tetrachloride similar to Example I wherein a Hanovia ultraviolet lamp provided the illumination, benzene hexachloride was obtained in which the isomer ratio was 11 percent gamma and 89 percent alpha benzene hexachloride.

EXAMPLE VIII

Chlorination of benzene tetrachloride

In a sealed pressure reaction vessel 100 parts of α-BTC was treated with 35.5 parts of chlorine in 375 parts of carbon tetrachloride. The solution was heated, in the dark, at a temperature of 50° C. for a period of 70 hours and for an additional period of 307 hours at a temperature of 100° C. The yield of benzene hexachloride was 99 percent. The distribution of BHC isomers in this product was about 90 percent alpha, 7.5 percent gamma, and about 2.0 percent beta. There was no delta or epsilon isomer present.

EXAMPLE IX

Chlorination of benzene tetrachloride

In an operation similar to Example I wherein gamma benzene tetrachloride was chlorinated in carbon tetrachloride, the yield of benzene hexachloride was about 90 percent. This material was nearly pure gamma benzene hexachloride. The only other isomer present was the alpha isomer.

EXAMPLE X

Chlorination of benzene tetrachloride

A mixture of the isomers of benzene tetrachloride, 100 parts, was treated as in Example I with chlorine in carbon tetrachloride. The total yield of benzene hexachloride was 132 parts, or 100 percent. The alpha, beta and gamma isomers of BHC in this product were in the proportion 80 : 6.3 : 13.7. This product did not possess an objectionable odor.

One method by which gamma benzene hexachloride can be manufactured by the process of our invention is illustrated in the following typical example.

To prepare high gamma benzene hexachloride we elutriated the crude product, obtained as in Example II, with twice its weight of methanol, thereby dissolving one-quarter of the solid material. The eluate from this extraction was concentrated, removing 60 percent of the methanol. On cooling to 25° C., crystalline material separated and was recovered by filtration. The benzene hexachloride therein consisted of 69.3 percent gamma benzene hexachloride.

EXAMPLE XI

2,3,4,5,6-pentachlorocyclohexene-1

To a water jacketed, vertical-tube glass reactor equipped with means for recording the temperature a distributing tube for gaseous chlorine and means for reflux, and illuminated with an infrared lamp placed one-third of the distance from the bottom of the reactor and one inch from the outer jacket was added 2770 parts of chlorobenzene and 12.5 parts of iodine. Over a period of five hours was added 950 parts of chlorine, maintaining the addition at the rate of about three parts per minute. During this addition of chlorine the temperature of the reaction mixture was maintained between 20 and 30° C. After addition of the chlorine was complete, the infrared light was turned off and nitrogen gas was passed through the reaction mixture in the dark to remove any unreacted chlorine. The reaction mixture was then distilled at a pressure of approximately 15 millimeters of mercury to remove the excess chlorobenzene. The residue from this treatment was treated with an aqueous solution of sodium sulfite to remove a small quantity of iodine and then fractionated at low pressure. At a pressure of 5 millimeters of mercury absolute a small quantity of di- and tri-chlorobenzenes was removed up to a temperature of 85° C. The pressure was thereupon reduced to one millimeter of mercury absolute and the material distilling up to a temperature of 110° C. was collected. This product, 378 parts, was a mixture of all the stereoisomers of 2,3,4,5,6-pentachlorocyclohexene-1, corresponding to a yield of 21.3 percent based on the chlorine charged to the reaction vessel. No tetrachlorobenzenes were isolated during the distillation. The trichlorobenzenes present accounted for about 2 percent of the chlorine charged to the reactor and the remainder was consumed in the formation of dichlorobenzenes.

This compound of our invention can be considered as a product of the partial addition of chlorine to chlorobenzene. However, our compound cannot be prepared by known methods of addition of chlorine to chlorobenzene, for in all such processes six chlorine atoms are added to the benzene nucleus, and the only addition product formed is heptachlorocyclohexane. Our process for the manufacture of pentachlorocyclohexene is essentially a dual process, although it can be conducted in a single step. The first stage comprises initiating the addition chlorination by light, peroxides, or similar catalysts, while the second stage comprises catalytically arresting the addition at four chlorine atoms.

On further purification of this chlorobenzenetetrachloride by fractionation, a product was obtained boiling at 116 to 118° C. at a pressure of 4 millimeters of mercury and had a refractive index ($N_D^{20}$) of 1.5632. On analysis this material was found to contain 27.96 percent carbon, 2.18 percent hydrogen and 69.82 percent chlorine, while the values calculated for the formula $C_6H_6Cl_5$ are carbon 28.33 percent, hydrogen 1.98 percent and chlorine 69.69 percent.

In other operations similar to Example XI we obtained other stereoisomers of 1,3,4,5,6-pentachlorocyclohexene-1 which melted at 66.9 to 67.4° C. and at 58.2 to 58.8° C.

The amount of iodine catalyst which is employed in the above embodiment of our method of manufacturing 2,3,4,5,6-pentachlorocyclohexene-1 is not critical and can be varied within wide limits. For example, the amount of iodine so-employed can vary between about 20 parts and 0.01 part per 100 parts of chlorine. One preferred embodiment of our process is to initiate the addition chlorination of chlorobenzene with light and to arrest the addition at four chlorine atoms per molecule of chlorobenzene by employing one part of iodine per 100 parts of chlorine. Furthermore, other catalysts can be employed and are within the scope of our invention. In particular, such catalysts include the iodide salts of metals, such as for example potassium, sodium, magnesium, calcium and mercury, and certain organic iodides, such as for example ethyl iodide, isopropyl iodide, iodobenzene and iodoform. Furthermore, the amount of chlorine employed in relation to the amount of chlorobenzene treated can be varied within broad limits, and we have found that one surprising method of increasing the quantity of pentachlorocyclohexene formed in a process such as that described in the above example, comprises increasing the amount of chlorine in a continuous operation such that the chlorine is not completely converted to organic chlorinated materials. That is, we produce a product of partial chlorine addition by employing an excess of chlorine. Other catalysts can be employed in manufacturing our pentachlorocyclohexene including air, sulfur and sulfur compounds and peroxides. For example, we can obtain our pentachlorocyclohexene by chlorinating chlorobenzene in the dark by a dual process wherein the initiating catalyst is hexaphenylethane, di-t-butyl peroxide or cumene hydroperoxide and the catalytic arresting agent is iodine, air, or sulfur chloride. The temperature range employed in the manufacture of our compound is not critical, but in general we prefer to employ temperatures in the range of −70° C. to 100° C.

We have found that 2,3,4,5,6-pentachlorocyclohexene-1 is a mixture of stereochemical isomers and that at least four such isomers are present. We have identified, by a combination of careful fractional crystallization, fractional distillation and chromatographic adsorption over silicic acid, four stereochemical isomers which we refer to as the alpha, beta, gamma and delta isomers. The physical properties and analyses of these isomers follow:

| Isomer of 2,3,4,5,6-pentachloro-cyclohexene-1 | Melting Point, ° C. | Boiling Point, ° C./4 mm. Hg | Analysis [1] | | | Refractive Index, ($n_D^{20}$) |
| --- | --- | --- | --- | --- | --- | --- |
| | | | Percent C. | Percent H | Percent Cl | |
| Alpha (α) | 68.2–68.6 | | | | 70.11 | |
| Beta (β) | | 116–118 | 27.96 | 2.18 | 69.82 | 1.5632 |
| Gamma (γ) | 58.2–58.8 | | | | 69.64 | |
| Delta (δ) | 70.5–71.3 | | | | 70.77 | |

[1] Calculated for $C_6H_5Cl_5$: C, 28.33%; H, 1.98%; Cl, 69.69%.

We have determined that other isomers exist in our 2,3,4,5,6-pentachlorocyclohexene-1 mixture as determined by spectrophotometric analysis and electron diffraction studies. We do not intend, however, that our compound be limited to any such restriction as to stereochemical isomers.

We have established a reactive double bond in our pentachlorocylohexene by a number of methods. For example, was have oxidized our compound by aqueous potassium permanganate. From this oxidation we obtained a diol (1,2-dihydroxyl-3,4,5,6-tetrachlorocyclohexane) when the oxidation was conducted at a temperature of 25° C., and a chlorinated dicarboxylic acid, containing four chlorine atoms when the oxidation was conducted at temperatures of 70–80° C. By this means we have also established that only four of the chlorine atoms are attached to methylene carbon atoms of the cyclohexene ring.

Our pentachlorocyclohexene undergoes all the reactions associated with the double bond in olefins and vinyl halides, and can be employed as a raw material in oxidation processes, Diels-Alder reactions, and in reactions involving addition of organic or inorganic reagents to the double bond. In addition, 2, 3, 4, 5, 6-pentachlorocyclohexene-1 finds utility in itself, as for example, as as insecticide and as a fungitoxic material.

The reactive carbon-to-carbon double bond in the novel compound of our invention undergoes the normal reactions characteristic of a vinylic olefin. For example, we can form a dibromo derivative by treating our pentachlorocyclohexene with bromine in an inert solvent. Chlorine, in the absence of an arresting catalyst, but in the presence of an addition catalyst, reacts with our pentachlorocyclohexene to form heptachlorocyclohexane. Furthermore, other oxidizing agents may be employed and, depending on the character of the oxidizing agent, we can obtain either a diol, a dialdehyde or, as above, a dicarboxylic acid. Likewise, other reagents will react with 2,3,4,5,6-pentachlorocyclohexene-1 to produce derivatives whereby atoms or groups are added to this double bond, either symmetrically or unsymmetrically, such as for example, butadiene, cyclopentadiene, thiocyanogen, ozone, peracetic acid, cyanogen bromide, hydrogen cyanide, hydrogen bromide, mercaptans, nitric acid, nitrogen oxides, diazo compounds, azides, sulfites, aryl sulfinic acids, hypohalous acids, etc.

Our novel pentachlorocyclohexene on treatment under conditions whereby dehydrochlorination occurs produces a mixture of trichlorobenzene isomers. This result was obtained by dehydrochlorination, for example in the presence of alcoholic caustic potash, or by thermal dehydrochlorination at elevated tempertaures in the neighborhood of 250–500° C. We have found that all the possible trichlorobenzene isomers are produced in approximately the following proportions: 1,2,4-trichlorobenzene, 87 percent; 1,2,3-trichlorobenzene, 5 percent and 1,3,5-trichlorobenzene, 8 percent. Likewise, we obtain these trichlorobenzenes when our pentachlorocyclohexene is dehydrochlorinated catalytically. Thus, even at a temperature of 25° C. we have produced trichlorobenzenes by treating pentachlorocyclohexene with aluminum chloride in the presence of benzene as a solvent. Of course, this reaction also proceeds more rapidly at the temperature of refluxing benzene. Furthermore, we have obtained trichlorobenzenes from our pentachlorocyclohexene with aluminum chloride, antimony pentachloride, and ferric chloride, for example, without a solvent at temperatures between 100° C. and 300° C.

Our pentachlorocyclohexene in the form of the mixture of stereoisomers or in the form of the individual isomers is an effective fungicide. The prevention of the germination of the spores of the two fungi *Alternaria oleracea* and *Sclerotinia fructicola* was determined by suspending our pentachlorocyclohexene in water in the presence of a dispersing agent at various concentrations, and examining under a microscope the effect on these fungi contained in a drop of water on a slide when treated with the pentachlorocyclohexene dispersions. Under these conditions we have determined that our β-pentachlorocyclohexene was effective when present in concentrations less than 100 p.p.m., while the α-pentachlorocyclohexene was only slightly less effective. The ability to prevent the sporulation of these fungi is indicative of the effectiveness of such agents in preventing fungus growth on important agricultural crops. For example, the *A. oleracea* is responsible for the potato blight and the *S. fructicola* is responsible for the damaging fungus growth relating to peach rot. Other fungus species which can be controlled by our material and the plant diseases for which they are responsible are listed below:

Diseases of grains

Wheat stem rust _____ *Puccinia gramminis*
Oat crown rust _____ *Puccinia coronata*
Rice brown spot _____ *Helminthosporium oryzae*
Oat smut _____ *Ustilago levis*

Diseases of tubers

Sweet potato stem rot _____ *Fusarium hyperoxysporum*
Sugar beet leaf spot _____ *Cercospora beticola*
Potato Rhizoctoniose _____ *Rhizoctonia solani*

Diseases of fruits

Apple scab _____ *Venturia inaequalis*
Pear blight _____ *Erwinia amylovora*
Cherry leaf spot _____ *Coccomyces hiemalis*
Citrus stem end rot _____ *Diaporthe citri*

We have also found that our 2,3,4,5,6-pentachlorocyclohexene-1 in all its various stereoisomeric forms is an effective insecticide. To demonstrate this utility we have suspended our pentachlorocyclohexenes in water in the presence of a dispersant, Triton X-100, and treated both the German roach and the milk weed bug with these dispersions at various concentrations. These tests were conducted by immersing individuals of these species in the suspensions and then observing the insects after replacement in the test cages. After 96 hours we found that at one percent concentration α-pentachlorocyclohexene was fatal to 70 percent of the so-treated German roaches and 85 percent of the milk weed bugs, while β-pentachlorocyclohexene gave 100 percent mortality with each species. On further reducing the concentration of the β-isomer to 0.1 percent we found that after 96 hours a 95 percent kill of milk weed bug was achieved.

To demonstrate the practical utility of this compound as an agent in treating plants for protection against insects and disease, we determined the effect of suspensions of our material on the wheat, cotton, soybean, cucumber and tomato plants by a variety of methods, such as spraying the entire plant with a one percent aqueous suspension until run-off, dipping the entire leaf of the plant in a one percent aqueous suspension, applying a lanolin paste of our material to the leaf and stem of such plants and finally determining the effect of our material upon the germination of seeds in a medium moistened with concentrations as high as one tenth percent of our material. In the above tests we found that little or no damage was observed in comparison with the controls, and the plants or seeds continued to grow normally after such application.

EXAMPLE XII

*1,2,3,4,5,6-hexachlorocyclohexene*

To a water jacketed, vertical-tube glass reactor equipped with means for recording the temperature, a distributing tube for gaseous chlorine and means for reflux, and illuminated with two 250-watt infrared lamps and two 275-watt RS sunlamps placed one-third of the distance from the bottom of the reactor and one inch from the outer jacket, was added 3110 parts of o-dichlorobenzene and 9 parts of iodine. Over a period of 14.5 hours was added 1000 parts of chlorine, maintaining a constant addition rate. During this addition of chlorine the temperature of the reaction mixture was maintained at approximately 30° C. After addition of the chlorine was complete, the infrared lights and sunlamps were turned off and nitrogen gas was passed through the reaction mixture in the dark to remove any unreacted chlorine. The reaction mixture was then steam distilled, recovering the distillate in two portions of 2286 parts and 464 parts. These were identified as mixtures of di- and tri-chlorobenzenes. The distillation residue partially solidified on standing at a temperature of 25° C. This solid material was 35.5 parts of 1,2,4,5-tetrachlorobenzene. The liquid portion was 855 parts of crude 1,2,3,4,5,6-hexachlorocyclohexene containing all the isomers thereof. This material crystallized on long standing and was purified by recrystallization from hexanes. The yield of hexachlorocyclohexene was 43 percent based on the chlorine consumed. The product contained 73.70 percent chlorine while the formula $C_6H_4Cl_6$ requires 73.65 percent chlorine.

The amount of iodine catalyst which is employed in the above embodiment of our method of manufacturing 1,2,3,4,5,6-hexachlorocyclohexene is not critical and can be varied within wide limits. For example, the amount of iodine so-employed can vary between about 20 parts and .01 part per 100 parts of chlorine. A preferred embodiment of our process is to initiate the addition chlorination of o-dichlorobenzene with actinic light and to arrest the addition at four chlorine atoms per molecule of o-dichlorobenzene by employing one part of iodine per 100 parts of chlorine. Furthermore, other catalysts can be employed and are within the scope of our invention. In particular, such catalysts include the iodide salts of metals, such as for example potassium, sodium, magnesium, calcium and mercury, and certain organic iodides, such as for example ethyl iodide, isopropyl iodide, iodobenzene and idoform. Furthermore, the amount of chlorine employed in relation to the amount of dichlorobenzene treated can be varied within broad limits, and we have found that one method of increasing the quantity of hexachlorocyclohexene, formed in a process such as that described in the above example, comprises increasing the amount of chlorine in a continuous operation such that the chlorine is not completely converted to organic chlorinated materials. Other catalysts can be employed in manufacturing hexachlorocyclohexene including air, sulfur and sulfur compounds, and peroxides. For example, we can obtain our hexachlorocyclohexene by chlorinating o-dichlorobenzene in the dark by a dual process wherein the initiating addition catalyst is hexaphenylethane, di-t-butyl peroxide or cumene hydroperoxide, and the catalytic arresting agent is iodine, air, or sulfur chloride The temperature range employed in the manufacture o our compound is not critical, but in general we prefer to employ temperatures in the range of −70° C. to 100° C.

We have found that 1,2,3,4,5,6-hexachlorocyclohexene is a mixture of stereochemical isomers. We have identified, for example, by a combination of careful fractional crystallization and chromatographic adsorption over silicic acid, two isomers which we refer to as the alpha and beta isomers. The physical properties and analyses of these isomers follow:

| Isomer of 1,2,3,4,5,6-hexachlorocyclohexene | Melting Point, ° C. | Analysis,[1] Percent Cl |
|---|---|---|
| Alpha (α) | 100–100.5 | 73.70 |
| Beta (β) | 139.8–140.4 | 74.18 |

[1] Calculated for $C_6H_4Cl_6$: Cl, 73.65%.

We have established a double bond of moderate reactivity in our hexachlorocyclohexene. When we treated our hexachlorocyclohexene with alcoholic potassium hydroxide we obtained only two products, 1,2,3,4- and 1,2,3,5-tetrachlorobenzene in approximately equal portions, and the amount of hydrogen chloride eliminated was equal to the quantity required by the equation $$C_6H_4Cl_6 \rightarrow C_6H_2Cl_4 + 2HCl$$

Thus, in addition, we have provided a novel and direct method for the production of those tetrachlorobenzenes which are not readily obtained by direct methods. For example, in the direct substitution chlorination of benzene, the predominant tetrachlorobenzene isomer produced is the 1,2,4,5-tetrachlorobenzene.

The reactive carbon-to-carbon double bond in this novel compound of our invention undergoes the normal reactions characteristic of a chlorinated olefin. For example, we can form a dibromo derivative by treating our hexachlorocyclohexene with bromine in an inert solvent. Furthermore, with powerful oxidizing agents we can obtain a tetrachlorinated dicarboxylic acid. Likewise, other reagents will react with 1,2,3,4,5,6-hexachlorocyclohexene to produce derivatives whereby atoms or groups are added to this double bond, either symmetrically or unsymmetrically, such as for example, butadiene, cyclopentadiene, thiocyanogen, ozone, cyanogen bromide, hydrogen cyanide, hydrogen bromide, mercaptans, nitric acid, nitrogen oxides, diazo compounds, sulfites, aryl sulfinic acids, hypohalous acids, etc.

Our hexachlorocyclohexene, in the form of the mixture of stereoisomers or in the form of the individual isomers, is an effective fungicide. The prevention of the germination of the spores of the two fungi *Alternaria oleracea* and *Sclerotinia fructicola* was determined by suspending our hexachlorocyclohexene in water in the presence of a dispersing agent at various concentrations, and examining under a microscope the effect on these fungi, contained in a drop of water on a slide, when treated with the hexachlorocyclohexene dispersions. Under these conditions we have determined that our material was effective in preventing sporulation of 50 percent of the fungi when present in concentrations less than 10 p.p.m. against *S. fructicola*, and less than 100 p.p.m. against *A. oleracea*. The ability to prevent the sporulation of these fungi is indicative of the effectiveness of our agent in preventing fungus growth on important agricultural crops. For example, the *A. oleracea* is responsible for the potato blight and the *S. fructicola* is responsible for the damaging fungus growth relating to peach rot. Other fungus species which can be controlled by this material and the plant diseases for which they are responsible are comparable to those listed above for 1,3,4,5,6-pentachlorocyclohexene-1.

We have also found that our 1,2,3,4,5,6-hexachlorocyclohexene is an effective insecticide. To demonstrate this activity we suspended our hexachlorocyclohexene in water in the presence of a dispersant, Triton X–100, and treated by total immersion individually both the German roach and the milk weed bug at various concentrations. The insects were observed for 96 hours after replacement in the test cages. After this period we found that at one percent concentration α-hexachlorocyclohexene was fatal to 100 percent of the so-treated insects of both species. On further reducing the concentration of the active ingredient to 0.1 percent we found that after 96 hours 50 and 65 percent kill was achieved with each of these species, respectively.

To demonstrate the practical utility of our compound as an agent in treating plants for protection against insects and disease, we determined the effect of suspensions of our material on the wheat, cotton, soybean, cucumber and tomato plants by a variety of methods, such as spraying the entire plant with a one percent aqueous suspension until run-off, dipping the entire leaf of the plant in a one percent aqueous suspension, applying a lanolin paste of hexachlorocyclohexene to the leaf and stem of such plants and, finally, determining the effect of our material upon the germination of seeds in a medium moistened with concentrations as high as one-tenth per cent of our material. In the above tests we found that little or no damage was observed in comparison with the controls, and the plants or seeds continued to grow normally after such application.

EXAMPLE XIII

*Benzene tetrabromide (3,4,5,6-tetrabromocyclohexene-1)*

To a water-jacketed glass reaction vessel illuminated with an infrared lamp was added 2190 parts of benzene, 12.5 parts of iodine and 850 parts of bromine. The temperature of the contents of the vessel was maintained at 30° C. for a period of 225 hours, during which period illumination of the reactant was continued. At the end of this period the products were separated as in Example I. The crude benzene tetrabromide was 7.5 parts, representing a yield of 0.8 percent based on the bromine added.

One novel compound of our invention is 1,2-dibromo-3,4,5,6-tetrachlorocyclohexane. Prior to our discovery that benzene can be partially additively chlorinated in the presence of a catalyst, it was not possible to prepare this material by any known means. We have found, however, that 3,4,5,6-tetrachlorocyclohexene-1, the product of such chlorination, can be brominated under conditions wherein two atoms of bromine are added to the existing double bond without causing a displacement or other shifting of the chlorine atoms present. Therefore, we have been able to prepare by direct means and in good yield this hitherto unknown and unusual chlorobromocycloaliphatic material. Each of the isomers add bromine to provide 1,2-dibromotetrachlorocyclohexanes, differing only with respect to the stereoisomerism of the chlorine, bromine and hydrogen atoms.

The following examples typify methods by which we have prepared these materials.

EXAMPLE XIV

To 200 parts of carbon tetrachloride in a reaction vessel provided with a reflux condenser and illuminated by a General Electric 275-watt RS reflector sunlamp, was added 55 parts of 3,4,5,6-tetrachlorocyclohexene-1 (benzene tetrachloride), comprising a mixture of BTC isomers, at a temperature of 25° C. and the mixture agitated until solution occurred. To this stirred solution was added 40 parts of liquid bromine over a period of 15 minutes, after which addition the reaction mixture was allowed to stand at a temperature of 25° C. for a period of 48 hours. At the end of this time the solution was chilled to a temperature of 0° C. and the product, 1,2-dibromo-3,4,5,6-tetrachlorocyclohexane, separated as crystals comprising a mixture of stereoisomeric forms. This product when recovered by filtration was 83 parts, corresponding to a yield of 87.4 percent based on the benzene tetrachloride employed. This material was further purified by two crystallizations from carbon tetrachloride to produce a material which had a melting point of 161.2 to 161.8° C., and contained 42.3 percent bromine and 37.9 percent chlorine. The formula $C_6H_6Br_2Cl_4$ requires bromine, 42.1 precent, and chlorine, 37.4 percent. This product corresponded to the dibromo addition product of α-BTC.

EXAMPLE XV

Gamma benzene tetrachloride having a melting point of 87.1 to 88.0° C. was photobrominated according to the procedure of Example XIV. The product originally separating from the carbon tetrachloride solution was recrystallized twice from normal hexane. This final product had a melting point of 110 to 130° C. and contained 43.0 percent bromine and 38.8 percent chlorine. This material is substantially a mixture of the isomeric dibromides derived from the gamma benzene tetrachloride.

One method which is preferred in separating the stereo isomers of the dibromotetrachlorocyclohexanes comprises chromatographic adsorption. In one embodiment a column is packed with silicic acid. The material to be chromatographed is dissolved in normal hexane which has been saturated with nitromethane at room temperature. After passing the hexane-nitromethane solution of the dibromotetrachlorocyclohexanes through the packed column, the adsorbed material is eluted through the packing with normal hexane. The eluted fractions are collected in 15 ml. portions and separately evaporated to dryness. By combining fractions of similar melting point and recrystallizing, the pure isomers of dibromotetrachlorocyclohexane are obtained.

EXAMPLE XVI

The mother liquor from the recrystallization of the product obtained in Example XV was evaporated to dryness and the residue consisted primarily of 1,2-dibromo-3,4,5,6-tetrachlorocyclohexane. This material contained 42.5 percent bromine and 36.5 percent chlorine.

To further separate this material into the various stereo isomeric forms, a chromatographic separation is achieved as in the foregoing.

EXAMPLE XVII 40 parts of the alpha isomer of benzene tetrachloride was brominated according to the procedure of Example I. The material which crystallized on cooling the reaction mixture comprised 83 parts of product. This material was recrystallized to provide two fractions, one, 25 parts, melted at 159 to 160° C. while the second, 48 parts, melted at 147 to 159° C. Analysis of the higher melting fraction showed the material to contain 42.9 percent bromine and 36.7 percent chlorine.

EXAMPLE XVIII

A mixture of the isomers of benzene tetrachloride, 46.5 parts, was treated with 3 parts of liquid bromine in carbon tetrachloride. The resulting solution was washed with aqueous sodium bisulfite followed by a treatment with water. The solution was then dried with anhydrous sodium sulfate. The carbon tetrachloride was removed by distillation at reduced pressure to provide a residue melting at 55 to 142° C. which was found by analysis to contain 41.2 percent bromine and 37.8 percent chlorine. This material consisted of a mixture of the isomers of 1,2-dibromo-3,4,5,6-tetrachlorocyclohexane. By a series of careful chromatographic adsorptions and elutions followed by a combination and recrystallization of the fractions having similar melting points, this mixture is separated into the various component stereoisomers of 1,2-dibromo-3,4,5,6-tetrachlorocyclohexane.

EXAMPLE XIX

In a vertical glass reactor provided with a distributing tube for introducing gaseous chlorine, a reflux condenser, and illuminated with an infrared lamp placed one-third of the distance from the bottom of the reactor was added 2200 parts of benzene and 6 parts of iodine. Over a period of five hours was added 950 parts of chlorine, maintaining the addition at the rate of about three parts per minute. During this addition of chlorine the temperature of the reaction mixture was maintained between 20 and 30° C. After addition of the chlorine was complete, the infrared light was turned off and nitrogen gas was passed through the reaction mixture in the dark to remove any unreacted chlorine. The excess benzene was removed by distillation and the residue was dissolved in carbon tetrachloride. This solution was treated with bromine according to the procedure of Example XIV. Upon crystallization, a mixture of the isomers of 1,2-dibromo-3,4,5,6-tetrachlorocyclohexane was obtained. By fractional crystallization a preliminary separation of the various isomers is made and each such fracton is then further treated by chromatography and further crystallization to achieve the desired separation into the stereoisomeric forms.

To illustrate the utility of our compound as an insecticide we determined the effectiveness of suspensions of 1,2-dibromo-3,4,5,6-tetrachlorocyclohexane in water against both German roaches and milk weed bug. For this purpose aqueous suspensions of our material were prepared containing 0.1 percent of the dibromotetrachlorocyclohexane and a small amount of Triton X-100 as a dispersant. Both German roaches and milk weed bugs were totally immersed in this suspension and then were placed under observation in the rearing colonies. In both instances after 96 hours a 100 percent mortality was achieved on those insects treated with our material. In addition we determined the effect of our dibromotetrachlorocyclohexanes on plants to determine whether its use as an insecticide would be accompanied by any deleterious effects on agricultural crops so treated. At concentrations as high as one percent of 1,2-dibromo-3,4,5,6-tetrachlorocyclohexane in water there was no effect when the entire leaf of tomato, cucumber and cotton plants was sprayed. Similarly our compound can be safely used with a wide variety of other important agricultural crops including soybean and cotton.

Although our material is stable under all ordinary conditions of use and storage, we have found that our material can be dehydrohalogenated more readily than the corresponding hexachloro compound, benzene hexachloride, but is more stable than the precursor of our material, benzene tetrachloride.

When our material is treated under dehalogenating conditions, that is either by refluxing with zinc dust in the presence of a solvent, or by treatment with alcoholic potassium iodide, our material produces benzene in good yield. This reaction is indicative of the fact that each of the six carbon atoms in the cyclohexane ring contains but a single halogen atom.

We have discovered that the dehydrohalogenation of cyclohexenes containing at least four halogen atoms, each of which is attached to a carbon atom not a member of the carbon-to-carbon double bond of the cyclo olefin, produces meta-dihalogenated aromatic compounds in high yield. In particular we have found that the halogenated cyclohexenes obtained by the arrested addition of halogen to a benzene nucleus, when treated under such conditions as to produce an aromatic structure by dehydrochlorination, produce a substantial proportion of dihalo-aromatic compounds possessing the meta-structural configuration.

Any of the well-known methods of dehydrohalogenating non-aromatic halogen compounds can be employed in the process of our invention. For example, thermal dehydrohalogenation can be employed where the other structural features of the material are such that the compound produced is stable under the conditions employed. Likewise, chemical dehydrohalogenation, the most common example of which is treatment with the hydroxides of the alkali and alkaline earth metals, can be employed. Furthermore, catalytic dehydrohalogenation can be successfully used, wherein the process occurs in the presence of such catalytic solid surfaces as silica gel, activated alumina, or activated charcoal. We also can employ catalysts which are soluble in the material being treated, as for example, ferric chloride, aluminum chloride and antimony pentachloride.

It is to be understood that in the process of our invention other dihalo isomers are co-present with the meta-dihalo isomer. However, meta-dihalo isomers form a substantial portion of our reaction product and in many instances are the major component.

EXAMPLE XX

Meta-dichlorobenzene

In a reaction vessel, provided with means for supplying heat and returning condensed reflux, a mixture of 20 parts of benzene tetrachloride was treated with 15 parts of potassium hydroxide in 85 parts of ethanol. This mixture was heated at reflux temperature for a period of two hours, at the end of which time the mixture was poured into water. The upper organic layer was separated, and treated with sodium sulfate to remove a small amount of entrained water. The organic product was separated and found by analysis to contain 6.66 parts of meta-dichlorobenzene, 0.24 part of para-dichlorobenzene and 6.30 parts of ortho-dichlorobenzene. Thus, benzene tetrachloride was converted to produce each of the three dichloro isomers, in the ratio of 49.8 percent meta, 1.8 percent para and 47.2 percent ortho.

An aliquot of the aqueous layer of the reaction mixture as above was analyzed for chlorine, whereupon it was determined that the conversion of benzene tetrachloride to the mixture of dichlorobenzenes was quantitative. Thus, the yield of meta-dichlorobenzene from the benzene tetrachloride was 49.8 percent.

A similar result is obtained when 3,4,5,6-tetrabromocyclohexene-1 and 1,3,4,5,6-pentachlorocyclohexene-1 are treated as in the above example. In the latter instance the product is a mixture of trichlorobenzenes, but those isomers in which at least two chlorine atoms are in meta-relationship are in substantial proportion.

EXAMPLE XXI

A sample of 10 parts of 3,4,5,6-tetrachlorocyclohexene-1 was heated for a period of 30 minutes in the presence of 0.2 part of anhydrous ferric chloride. At the end of this period the temperature was 125° C. The product on cooling was washed with water and treated with a decolorizing agent and submitted to spectrophotometric analysis. By this means it was established that the product contained 30 percent meta-dichlorobenzene, 70 percent of the o-isomer and only a trace of the p-isomer.

EXAMPLE XXII

A sample of 5 parts of 3,4,5,6-tetrachlorocyclohexene-1 was heated to a temperature of 185° C. in a reaction vessel containing a small amount of charcoal and samples were removed at different periods of time. After a period of two and one-half hours 40 percent of the starting material was converted to dichlorobenzenes containing 20 percent meta isomer. After a period of thirteen and one-half hours the reaction was 100 percent complete.

This application is a division of our application, Serial No. 325,454, filed December 11, 1952, which application is a continuation-in-part of our all now abandoned applications Serial No. 268,914, filed January 29, 1952, Serial No. 274,052, filed February 28, 1952, Serial No. 217,071, filed March 22, 1951, Serial No. 217,072, filed March 22, 1951, Serial No. 302,264, filed August 1, 1952, Serial No. 182,627, filed August 31, 1950, Serial No. 182,628, filed August 31, 1950, Serial No. 182,630, filed August 31, 1950 and Serial No. 182,631, filed August 31, 1950.

We claim:

1. A process for the manufacture of a dihaloaromatic compound rich in meta isomer which comprises the dehydrohalogenation of a 3,4,5,6-tetrahalocyclohexene-1 wherein each halogen is attached to a carbon atom not a member of the carbon to carbon double bond of the cyclohexene and wherein the halogen substituents are selected from the group consisting of chlorine and bromine under dehydrohalogenation conditions such as to produce an aromatic structure.

2. A process for the manufacture of a dichlorobenzene product rich in meta-dichlorobenzene which comprises the dehydrochlorination of 3,4,5,6-tetrachlorocyclohexene-1.

3. A process for the manufacture of a dibromobenzene product rich in meta-dibromobenzene which comprises the dehydrobromination of 3,4,5,6-tetrabromocyclohexene-1.

4. A process for the manufacture of a dihaloaromatic product rich in meta isomer which comprises treating a 3,4,5,6-tetrahalocyclohexene-1 wherein the halogen substituents are selected from the group consisting of chlorine and bromine with a hydroxide selected from the group consisting of alkali metal hydroxide and alkaline earth hydroxide.

5. A process for the manufacture of a dihaloaromatic product rich in meta isomer which comprises the catalytic dehydrohalogenation of a 3,4,5,6-tetrahalocyclohexene-1 wherein the halogen substituents are selected from the group consisting of chlorine and bromine.

6. A process for the manufacture of a dihaloaromatic product rich in meta isomer which comprises the thermal dehydrohalogenation of a 3,4,5,6-tetrahalocyclohexene-1 wherein the halogen substituents are selected from the group consisting of chlorine and bromine.

7. A process for the manufacture of a product rich in meta-dichlorobenzene which comprises treating 3,4,5,6-tetrachlorocyclohexene-1 with a hydroxide selected from the group consisting of alkali metal hydroxide and alkaline earth hydroxide.

References Cited in the file of this patent

FOREIGN PATENTS 274,235   Switzerland _____ Mar. 31, 1951

OTHER REFERENCES

Van der Linden, "Ber. der deut. chem. Gesell.," vol. 45, pages 231–247 (1912).